(12) United States Patent
Groleau (10) Patent No.: US 11,535,136 B2
(45) Date of Patent: Dec. 27, 2022

(54) HEADREST WITH INTEGRATED NOSE AND LOUDSPEAKER ENCLOSURE

(71) Applicant: HARMAN INTERNATIONAL INDUSTRIES, INCORPORATED, Stamford, CT (US)

(72) Inventor: Patrick Groleau, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 304 days.

(21) Appl. No.: 16/809,158

(22) Filed: Mar. 4, 2020

(65) Prior Publication Data

US 2020/0282889 A1   Sep. 10, 2020

Related U.S. Application Data (60) Provisional application No. 62/815,979, filed on Mar. 8, 2019.

(51) Int. Cl.
*H04R 1/02* (2006.01)
*B60N 2/879* (2018.01)

(52) U.S. Cl.
CPC .......... *B60N 2/879* (2018.02); *H04R 1/025* (2013.01); *H04R 2499/13* (2013.01)

(58) Field of Classification Search
CPC .......... B60N 2/879; H04R 1/025; H04R 1/28; H04R 2499/13; H04R 5/023
USPC ...................................................... 297/217.5
See application file for complete search history.

(56) References Cited

U.S. PATENT DOCUMENTS

| | | | | |
|---|---|---|---|---|
| 4,027,112 A * | 5/1977 | Heppner | ................. | H04R 5/023 381/301 |
| 5,687,230 A * | 11/1997 | Olausson | ............. | B60R 11/0217 379/430 |
| 5,887,071 A * | 3/1999 | House | ....................... | H04R 5/02 381/87 |
| 6,094,496 A * | 7/2000 | Stowers, Sr. | ........... | H04R 5/023 381/361 |
| 6,123,389 A * | 9/2000 | O'Connor | ............ | B60N 2/2851 5/636 |
| 6,991,289 B2 * | 1/2006 | House | ..................... | B60N 2/879 297/217.4 |
| 9,699,537 B2 * | 7/2017 | Oswald | ................... | B60N 2/879 |
| 9,860,643 B1 * | 1/2018 | Oswald | .................... | H04R 3/14 |
| 10,271,119 B2 * | 4/2019 | Fujita | ....................... | A47C 7/72 |
| 10,696,201 B2 * | 6/2020 | Fujikake | ................ | B60N 2/879 |
| 10,721,554 B2 * | 7/2020 | Groleau | ................. | H04R 1/025 |
| 10,926,678 B2 * | 2/2021 | Oswald | ................. | H04R 1/323 |
| 2003/0142835 A1 * | 7/2003 | Enya | ....................... | H04R 3/12 381/387 |

(Continued)

*Primary Examiner* — Quynh H Nguyen
(74) *Attorney, Agent, or Firm* — Brooks Kushman P.C.

(57) ABSTRACT

In at least one embodiment, a vehicle apparatus is provided. The apparatus includes a core, a nose, a first loudspeaker, and a first loudspeaker housing. The core is positioned within a headrest for a seat of a vehicle. The nose attaches to the core and is positioned within the headrest. The first loudspeaker is positioned on the nose for providing an audio signal from the headrest. The first loudspeaker housing receives the first loudspeaker and is positioned on the nose. The first loudspeaker housing extends along a first outer edge of the core to decrease an overall length of the core and the nose along a first axis in the vehicle.

19 Claims, 8 Drawing Sheets

(56) References Cited

U.S. PATENT DOCUMENTS

| | | | | |
|---|---|---|---|---|
| 2004/0021350 A1* | 2/2004 | House | .................. | A47C 7/72 |
| | | | | 297/217.4 |
| 2005/0190935 A1* | 9/2005 | Sakamoto | ............... | H04R 5/02 |
| | | | | 381/86 |
| 2006/0250017 A1* | 11/2006 | Otto | .................. | B60N 2/865 |
| | | | | 297/410 |
| 2015/0201260 A1* | 7/2015 | Oswald | ................. | H04R 1/028 |
| | | | | 381/86 |
| 2016/0039320 A1* | 2/2016 | Subat | .................. | H04R 1/02 |
| | | | | 264/273 |
| 2018/0035185 A1* | 2/2018 | Fujita | .................. | H04R 1/02 |
| 2019/0118688 A1* | 4/2019 | Fujikake | ............ | B60R 11/0217 |
| 2019/0193612 A1* | 6/2019 | Oswald | ............... | H04R 1/2803 |
| 2019/0222924 A1* | 7/2019 | Groleau | ............. | H04R 1/025 |
| 2020/0010002 A1* | 1/2020 | Fu | .................. | H04R 1/025 |
| 2020/0043459 A1* | 2/2020 | Itabashi | ............. | G10K 11/178 |
| 2020/0045396 A1* | 2/2020 | Keilwert | ............ | G07F 17/3227 |
| 2020/0219478 A1* | 7/2020 | Zafeiropoulos | ........ | H04R 1/025 |
| 2020/0282889 A1* | 9/2020 | Groleau | ............. | H04R 1/28 |
| 2021/0227326 A1* | 7/2021 | Watanabe | ............ | H04R 5/023 |

\* cited by examiner

HEADREST WITH INTEGRATED NOSE AND LOUDSPEAKER ENCLOSURE

CROSS-REFERENCE TO RELATED APPLICATIONS

This application claims the benefit of U.S. provisional application Ser. No. 62/815,979 filed Mar. 8, 2019, the disclosure of which is hereby incorporated in its entirety by reference herein.

TECHNICAL FIELD

Aspects disclosed herein generally relate to a headrest with an integrated nose and loudspeaker enclosure. The aspects and others are set forth below and in the accompanying figures.

BACKGROUND

U. S. Publication No. 2016/0039320 to Subat et al. discloses a headrest with speakers. The headrest includes a headrest frame; a pair of left and right enclosures supported by the headrest frame; speaker units supported in the enclosures respectively; and a headrest cushion member supported by the headrest frame to support a head. The headrest cushion member includes a net member having a pair of left and right acoustically transparent parts at places substantially facing the respective speaker units; and soundproof parts disposed between the pair of left and right acoustically transparent parts in the net member and between the pair of left and right enclosures respectively.

SUMMARY

In at least one embodiment, a vehicle apparatus including a core, a nose, a first loudspeaker, and a first loudspeaker housing is provided. The core is positioned within a headrest for a seat of a vehicle. The nose attaches to the core and is positioned within the headrest. The first loudspeaker is positioned on the nose for providing an audio signal from the headrest to an interior the vehicle. The first loudspeaker housing receives the first loudspeaker and is positioned on the nose. The first loudspeaker housing extends along a first outer edge of the core to decrease an overall length of the core and the nose along a first axis in the vehicle.

In at least another embodiment, a vehicle apparatus is positioned in a headrest of a vehicle. The apparatus includes a core, a nose, a first loudspeaker, a first loudspeaker housing, a second loudspeaker, and a second loudspeaker housing. The core is positioned within the headrest for a seat of the vehicle. The nose attaches to the core and is positioned within the headrest. A first loudspeaker is positioned on a first side of the nose for providing an audio signal from the headrest. The first loudspeaker housing receives the first loudspeaker and is positioned on the first side of the nose. The second loudspeaker is positioned on a second side of the nose that is opposite to the first side of the nose for providing the audio signal from the headrest. The second loudspeaker housing receives the second loudspeaker and is positioned on the second side of the nose.

In at least another embodiment, a vehicle apparatus including a core, a nose, and a loudspeaker is provided. The core is positioned within the headrest for a seat of the vehicle. The nose is attached to the core. The loudspeaker is positioned on the nose for providing an audio signal from the headrest. The loudspeaker housing includes an enclosed volume to receive the loudspeaker and is positioned on the nose. The enclosed volume extends along a first outer edge of the core to decrease an overall length of the core and the nose along a first axis in the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle Original Equipment Manufacturers (OEMs) seek to incorporate one or more loudspeakers into a headrest of a seat. Generally, the headrest includes various components that make up a joint that is the "core", "nose", "loudspeaker(s)", in addition to a sealed volume such as an 'enclosure' if required by the loudspeaker. Due to various styling executions, the headrest may be too thin in the fore/aft direction of a vehicle. This condition may not allow for a standard design execution. Therefore, the embodiments disclosed herein may provide, but not limited to, combining several components to create an integrated design which may, for example, reduce fore/aft thickness of the headrest.

In one example, an automotive headrest is comprised of several components such a for example, the core, nose, foam, and studio surface (e.g., leather or fabric). Automotive headrests are starting to incorporate loudspeakers therein with headrest surfaces that may not be in the same place. A single nose design with modular rear speaker enclosure halves as disclosed herein allows for a single part to be used over and over across multiple vehicles and trims simply by replacing the back half of the enclosure to account for different front face locations of the headrest.

In general, it may be desirable to package one or more loudspeakers into a headrest of seat in the vehicle to include a common design with respect adjustability in the fore and/or aft directions to account for various studio surfaces of the headrest. The embodiments disclosed herein provide for, not limited to, a headrest having a nose with one or more loudspeaker enclosure mounts that each receive a corresponding loudspeaker.

Figure 1:
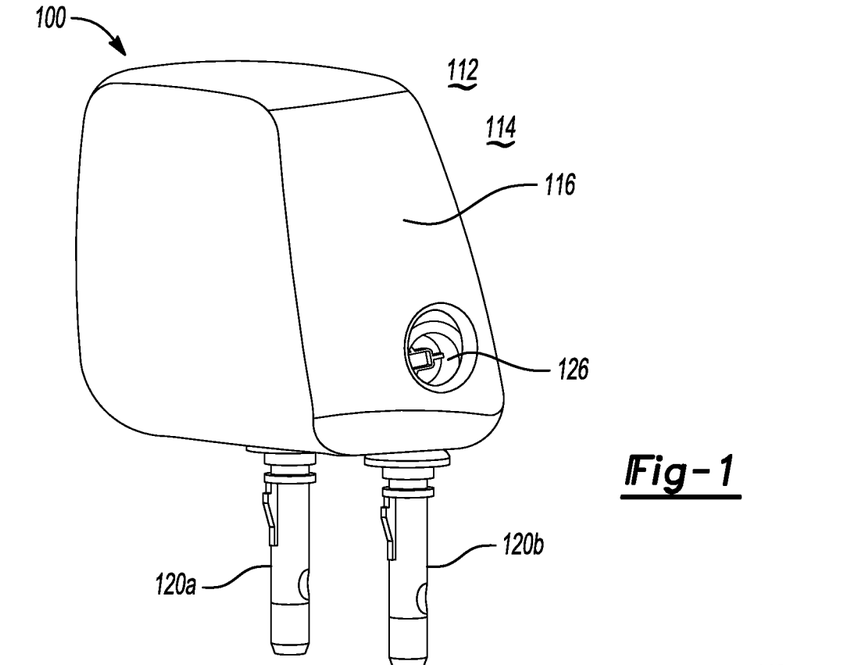
FIG. 1 depicts a perspective view of a first headrest.
Figure 2:
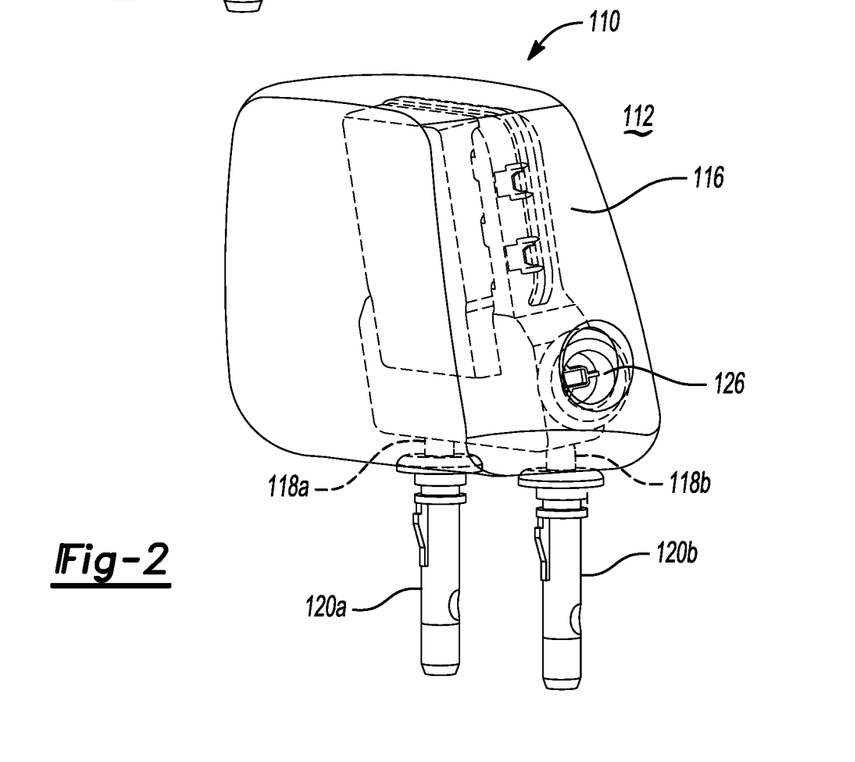
FIG. 2 depicts a perspective view of the first headrest of FIG. 1 including a core and a nose.
Figure 3:
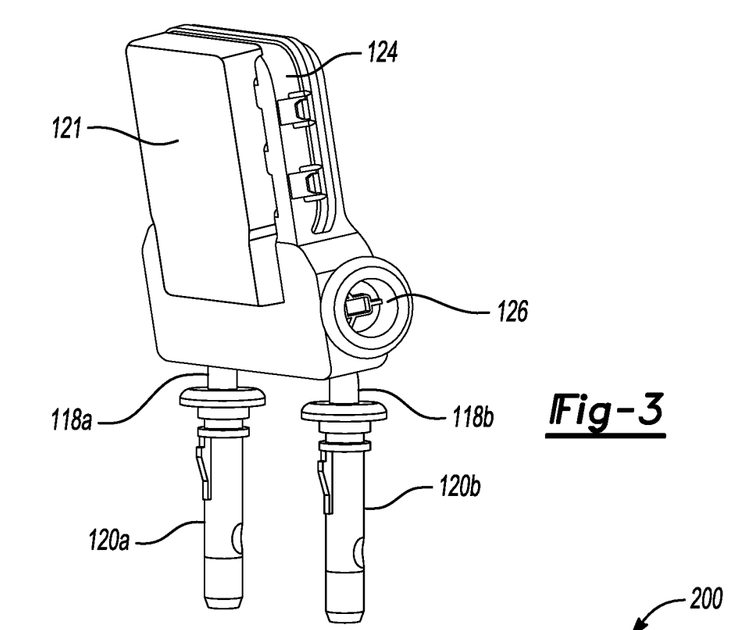
FIG. 3 depicts a perspective view of the core and the nose of the first headrest of FIG. 1.
Figure 4:
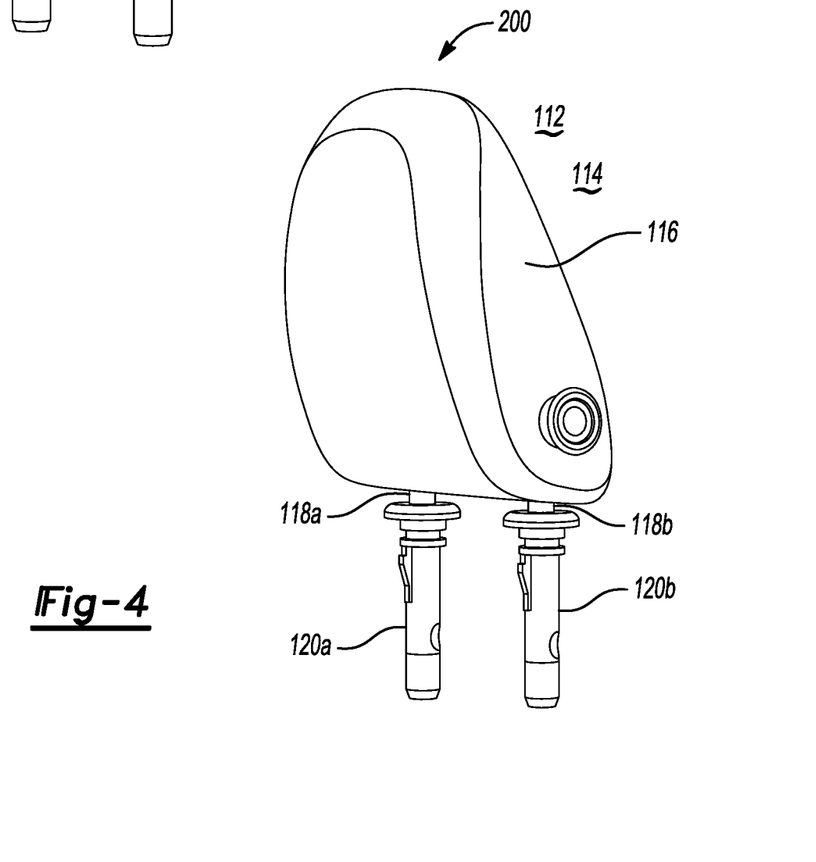
FIG. 4 depicts a perspective view of a second headrest in accordance to one embodiment.
Figures 5, 6:
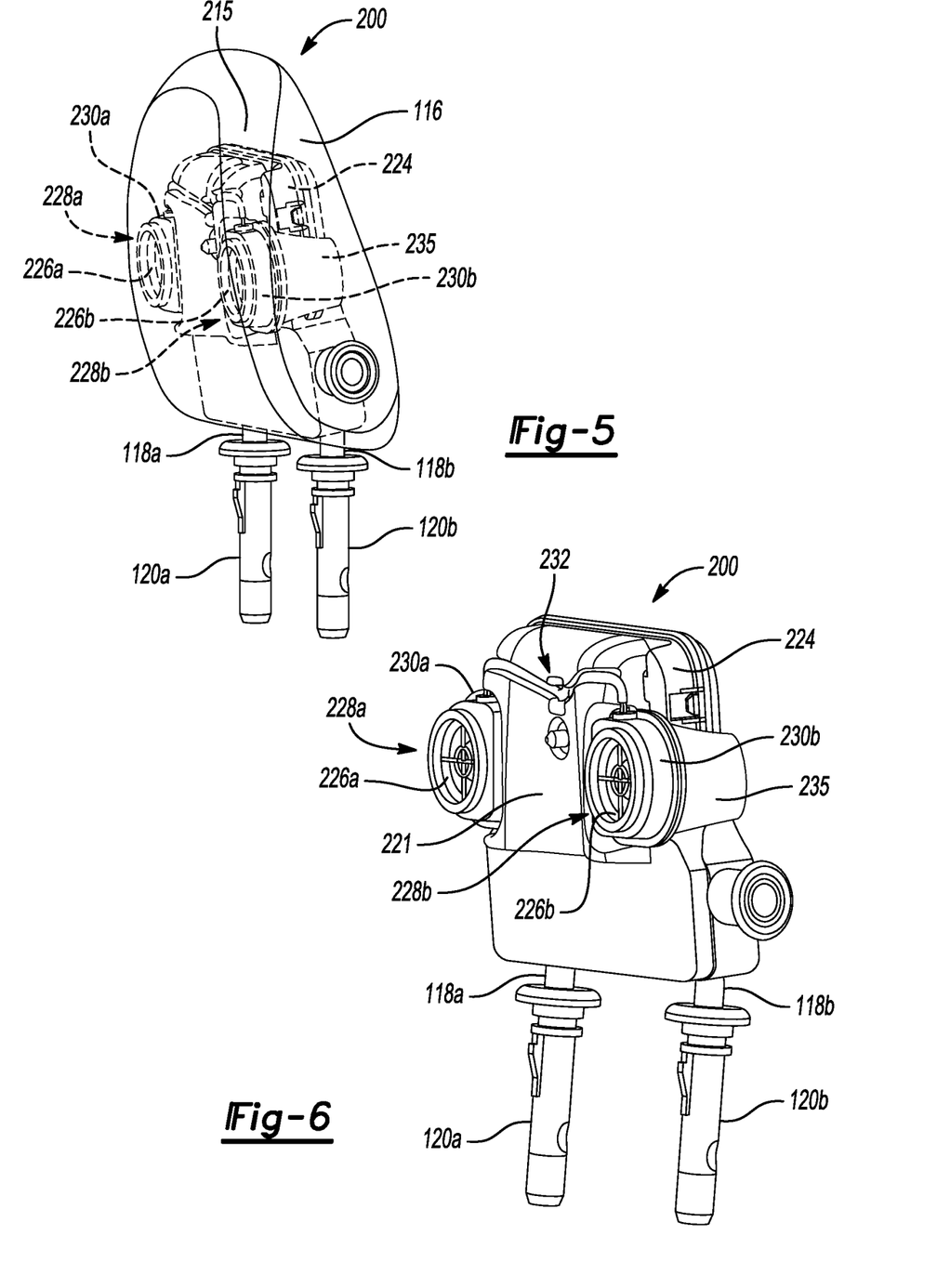
FIG. 5 depicts a perspective view of the second headrest including a core and a nose of the second headrest of FIG. 4 in accordance to one embodiment.
FIG. 6 depicts a perspective view of the core and the nose of the second headrest of FIG. 5 in accordance to one embodiment.

FIG. 1-3 generally depict various views of a first headrest 100 of a seat 112 of a vehicle 114. As shown, the first headrest 100 generally includes an outer shell 116 and one or more support posts 118a, 118b. It is recognized that the first headrest 100 may be removably coupled to a seatback (or back rest) (not shown) and that the first headrest 100 may slideably move in relation to the seatback to adjust to a height of a driver or passengers head in relation to the seatback. For example, the seatback may include post guides 120a, 120b to enable respective support posts 118a, 118b to slide relative to the seatback. In one embodiment, the support posts 118a, 118b may be implemented as a single unitary post (e.g., a U-shaped post) with the ends forming the posts 118a, 118b that are slideably received at the support posts 118a, 118b. In another example, the support post 118a, 118b may be each be formed of a single or unitary component.

The first headrest 100 generally includes a nose 121 and a core 124. The nose 121 and the core 124 are coupled with one another to support at least the outer shell 116 against a vehicle occupant's head. The core 124 generally includes a recess 126 to receive a switch (not shown). A vehicle occupant may select the switch to adjust the height of the first headrest 100 relative to the seatback.

Figures 7, 8:
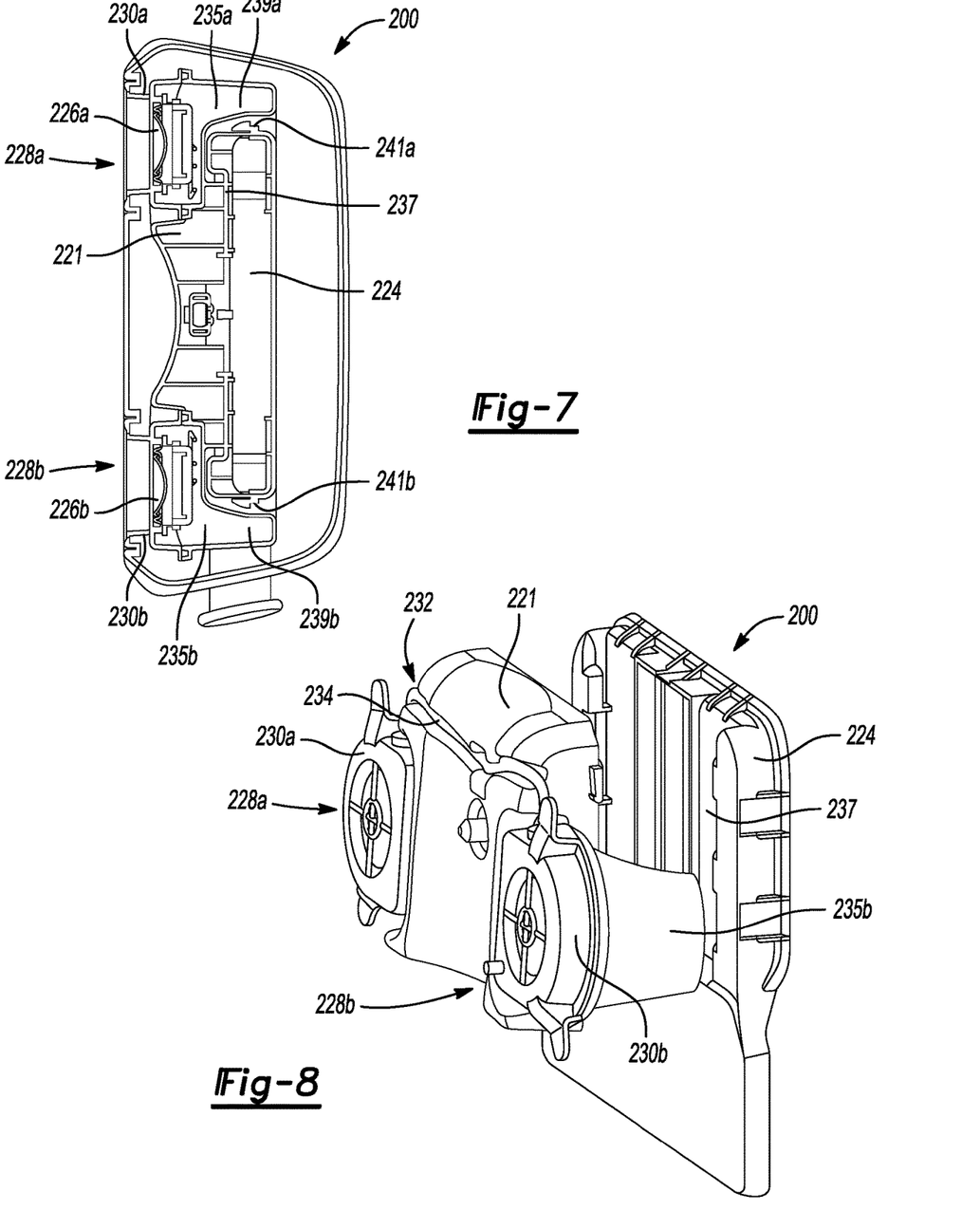
FIG. 7 depicts a top view of the second headrest in accordance to one embodiment.
FIG. 8 depicts a perspective view of the core and the nose of the second headrest in accordance to one embodiment.

FIG. 4-9 generally depict various views of a second headrest 200 of the seat 112 in accordance to one embodiment. As shown, the outer shell 116 is shaped and sized differently from the outer shell 116 depicted in connection with FIGS. 1-3. In particular, the outer shell 116 defines a smaller profile (or smaller headrest volume 215) than that of the outer shell 116 depicted in FIGS. 1-3. The second headrest 200 includes a nose 221 a core 224, and a plurality of loudspeakers 226a, 226b positioned within the headrest volume 215. It is recognized that the number of loudspeakers 226 implemented within the second headrest 200 may vary. In general, loudspeaker enclosures 228a, 228b are provided for receiving and/or supporting the loudspeakers 226a, 226b, respectively. Each loudspeaker enclosure 228a, 228b generally includes a cover mount 230a, 230b, respectively and an elongated loudspeaker housing 235a, 235, respectively. The cover mounts 230a, 230b generally receive a front side of the corresponding loudspeakers 226a, 226b respectively. The loudspeaker housings 235a, 235b are generally positioned rearward of the mounts 230a, 230b. The loudspeaker housings 235a, 235b each extend rearwardly adjacent to, and beyond a front face 237 of the core 224 (see FIGS. 7 and 8). The overall length at which the loudspeaker housing 235a, 235b extend relative to the front face 237 of the core 224 may vary. As shown, the housings 235a, 235b are integrated with the nose 221. Each housing 235a, 235b generally defines an enclosed volume 239a, 239b for enabling each corresponding loudspeaker 226a, 226b to generate enough audio volume for passengers positioned in the seat 112 of the vehicle 114. For example, the enclosed volume 239a, 239b stores air therein to enable the loudspeakers 226a, 226b to increase air pressure as such loudspeakers 226, 226b undergo excursion in a generally linear direction (e.g., fore and aft direction) while transmitting audio signals into the vehicle 114. The extension of the loudspeaker housing 235a, 235b relative to the front face 237 of the core 224 generally enable the loudspeakers 226a, 226b to be positioned in the smaller profile of the second headrest 200 in comparison to the larger profile of the headrest as illustrated on FIGS. 1-3. As shown in FIG. 7, at least a portion of the loudspeaker housings 235a, 235b extend in parallel to corresponding outboard outer edges 241a, 241b of the core 224 to create an overlap aspect between the housings 235a, 235b (and the enclosed volume 239a, 239b) and the core 224. This aspect may reduce the overall length of the nose 221 and the core 224 in the second headrest 200 along a first axis 249. The first axis 249 extends from a rear of the vehicle 114 to a front of the vehicle 114 (e.g., in an aft direction to a fore direction in the vehicle 114). In reference to FIG. 8, the nose 221 generally defines a wire channel 232 to enable a wire harness 234 to pass to each loudspeaker 226a, 226b.

Figure 9:
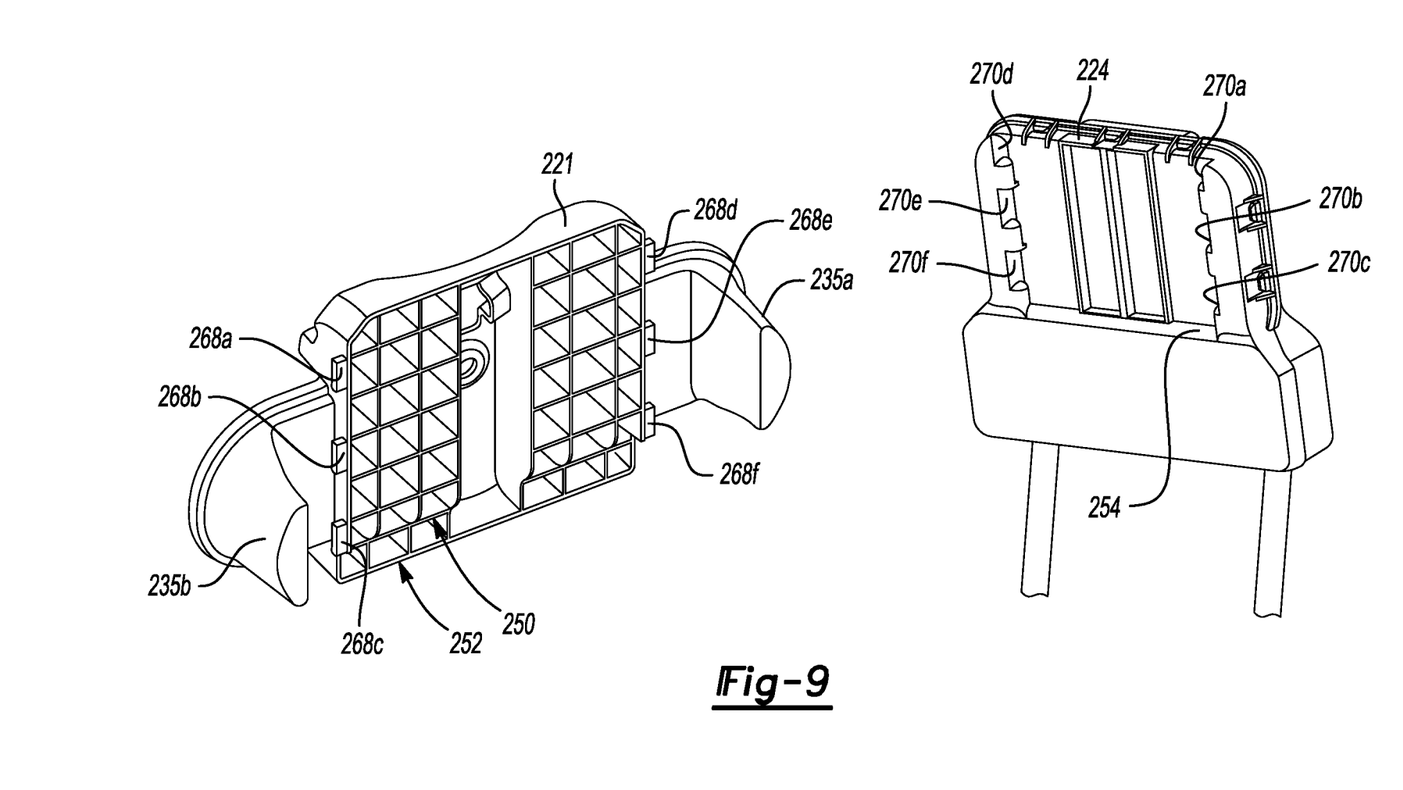
FIG. 9 depicts a view of a rear side of the nose and a front side of the core for the second headrest in accordance to one embodiment.

FIGS. 8-9 depicts a more detailed view of the nose 221 as set forth in connection with FIGS. 4-7. In particular, FIG. 8 depicts an exploded view of the nose 221 and the core 224 of the second headrest 200 as illustrated in FIGS. 4-7. FIG. 9 generally depicts a rear view of the nose 221 and a front side view of the core 224. This implementation as illustrated in FIGS. 8-9 generally enable for the overall length (or thickness) in the fore/aft position of the vehicle 114 to vary based on the overall length in the fore/aft direction of the second headrest 200 while maintaining a similar core 224 that has a length in the fore/aft direction in the vehicle 114 that does not change since the nose 221 may be removably coupled to the core 224. Thus, depending on the overall length of the second headrest 200, varying lengths of the nose 221 (e.g., the front face of the nose 221 in addition to the length of the loudspeaker housing 235a or 235b) may be provided to accommodate different length profiles of the second headrest 200 in the fore/aft position (or along the first axis 249).

The nose 221 generally includes a plurality of first connecting mechanisms 268a-268f positioned on a rear side thereof. The core 224 generally includes a plurality of second connecting mechanisms 270a-270f positioned on a front side thereof. The first connecting mechanisms 268a-268f mate with the second connecting mechanisms 270a-270f to couple the nose 221 to the core 224. The corresponding first connecting mechanisms 268a-268f of the nose 221 may slide behind the corresponding second connecting mechanism 270a-270f of the core 224 and remain engaged with one another other. The nose 221 includes a rearward lower projecting member 250 and a bottom projecting member 252. The bottom projecting member 252 is recessed relative to the lower projecting member 250. The core 224 includes a forward extending member 254 positioned on a front side thereof. As corresponding first connecting mechanisms 268a-268f of the nose 221 slide behind the corresponding second connecting mechanism 270a-270f of the core 224, the rearward lower projecting member 250 of the nose 221 contacts the forward extending member 254 of the core 224. The forward extending member 254 prevents the rearward lower projecting member 250 from moving down any further. This condition keeps the corresponding first connecting mechanisms 268a-268f of the nose 221 from sliding past the corresponding second connecting mechanism 270a-270f of the core 224 and thereby keeps the corresponding first connecting mechanisms 268a-268f of the nose 221 engaged with the corresponding second connecting mechanism 270a-270f of the core 224.

Figures 10, 11, 12:
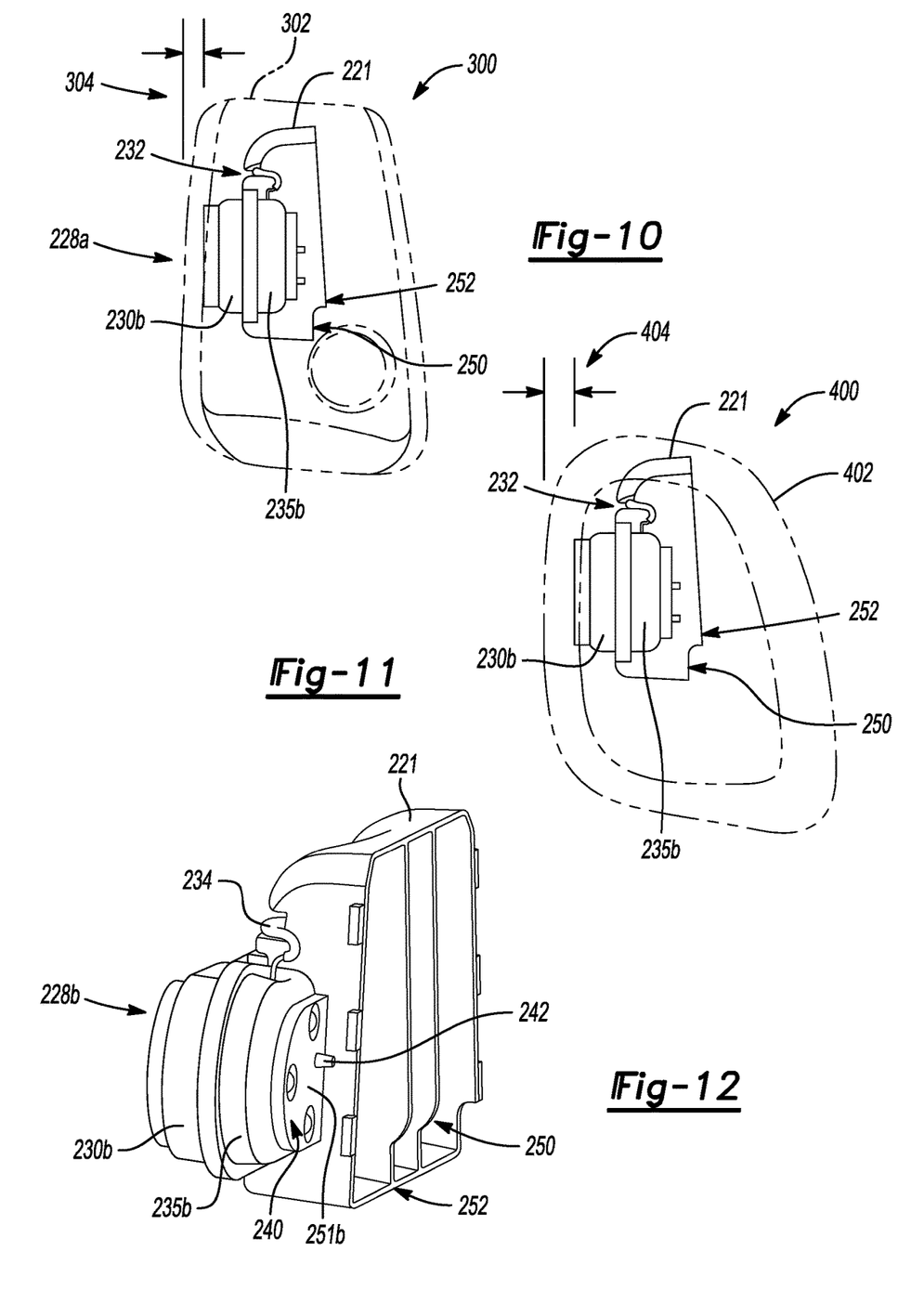
FIG. 10 depicts a side view of a third headrest in accordance to one embodiment.
FIG. 11 depicts a side view of a fourth headrest in accordance to one embodiment.
FIG. 12 depicts a partial rear view of a core and nose that may be implemented in the third headrest and/or the fourth headrest in accordance to one embodiment.

FIG. 10 depicts a side view of the nose 221 positioned in a third headrest 300 in accordance to one embodiment. The third headrest 300 includes an outer shell 302 that surrounds the nose 221. The outer shell 302 extends at a length in the fore-aft direction that is longer than the length of the outer shell 202 as noted in connection with FIGS. 3-9. At 304, a length from a front of the loudspeaker enclosure 228 to a front surface of the outer shell 302 is generally shown. While not shown, it is recognized that the core 224 is present within the third headrest 300. The third headrest 300 includes the loudspeakers enclosures 228a, 228b and the loudspeakers 226a, 226b, positioned therein, respectively. The loudspeaker enclosures 228a, 228b include the cover mounts 230a, 230b, respectively and the loudspeaker housings 235a, 235b, respectively. The overall length of the loudspeaker housing 235a, 235b as illustrated in connection with the third headrest 300 may be smaller than the overall length of the housings 235a, 235b as illustrated in connection with the second headrest 200 given that the overall profile for the third headrest 300 may be larger than that of the second headrest 200.

FIG. 11 depicts a side view of the nose 221 positioned in a fourth headrest 400 in accordance to one embodiment. The fourth headrest 400 includes an outer shell 402 that surrounds the nose 221. At 404, a length from a front of the loudspeaker enclosure 228 to a front surface of the outer shell 302 is generally shown. The fourth headrest 400 may correspond to a large headrest studio surface. The length illustrated at 404 is generally larger than the length illustrated at 304 in connection with FIG. 10. The nose 221 as and the loudspeaker enclosures 228a, 228b are generally similar to the nose 221 and the loudspeaker enclosures 228a, 228b as illustrated in connection with FIG. 10.

Figure 13:
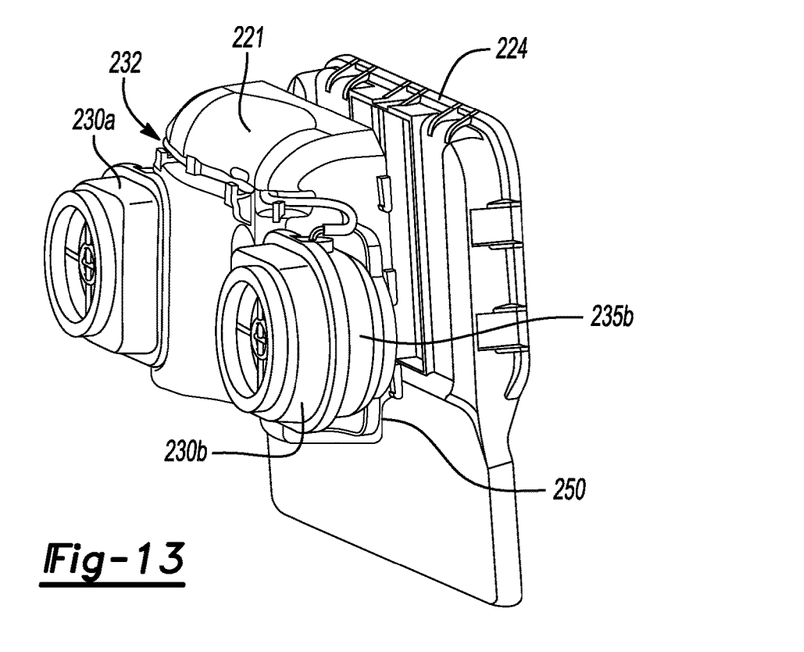
FIG. 13 depicts a front perspective view of the core and the nose that may be implemented in the third headrest and/or the fourth headrest in accordance to one embodiment.

FIG. 12 illustrates a partial rear side view of the nose 221 in accordance to one embodiment. Specifically, each of the loudspeaker housings 235a, 235b generally comprise interlocking mechanisms 240. The interlocking mechanisms 240 for each housing 235a, 235b receive respective mating elements 242 that are positioned on extending flange portions 251a, 251b. The extending flange portions 251a, 251b are integrally formed on the nose 221. It is recognized that the interlocking mechanisms 240 may be formed of male (or protruding members) to engage with the mating elements 242. Alternatively, the interlocking mechanism 240 may be formed of openings to receive protruding mating elements for each enclosure 228a, 228b. In addition, the nose 221 may define a cavity therein to receive a mating portion (not shown) of the core 224 to enable the core 224 to be attached to the nose 221. It is recognized that the mounts 230a, 230b and the loudspeaker housings 235a, 235b may remain fixed (i.e., dimensionally the mounts may remain fixed). However, the back half of the integrated enclosure (or nose 221) may vary or change dimensionally to compensate for different fore/aft dimension difference between studio surfaces. In one example, the overall length of the back half of the integrated enclosure (or nose 221) may vary to provide such compensation. Thus, it is recognized that the nose 221 may be implemented in any number of outer shell configurations for a headrest and that the size and shape of the outer shell 116 may vary. FIG. 13 depicts a perspective view of the nose 221 and the core 224 in accordance to one embodiment.

Figure 14:
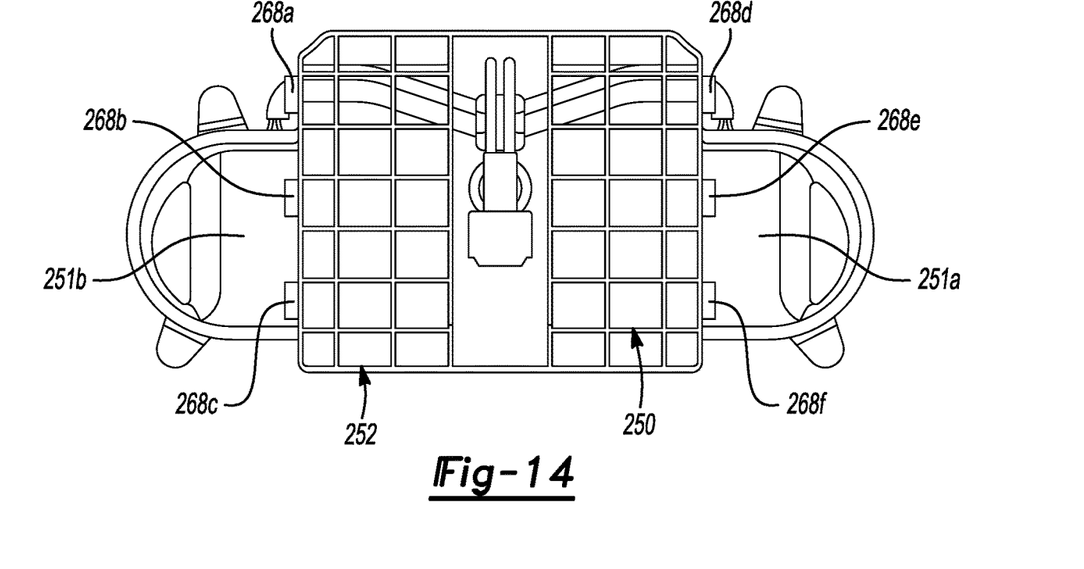
FIG. 14 depicts a rear view of the core and the nose that may be implemented in the third headrest and/or the fourth headrest in accordance to one embodiment.

FIG. 14 depicts a complete rear view of the nose 221 in accordance to one embodiment. In the embodiment illustrated in FIG. 14, the loudspeaker housings 235a, 235b may be fixed to the extending flange portions 251a, 251b via adhesive and thus this embodiment need not require the use of the interlocking mechanisms 240 or the mating elements 242 as set forth in FIG. 12. As noted above, the nose 221 generally includes the plurality of first connecting mechanisms 268a-268f positioned on the rear side thereof to mate with the second connecting mechanisms 270a-270f (see FIG. 9 for the second connecting mechanisms 270a-270f) to couple the nose 221 to the core 224. In the embodiments illustrated in FIGS. 10-14, it is recognized that the cover mounts 230a, 230b may be integrated with the loudspeaker 235a, 235b to each form a single piece for housing the loudspeakers 226a, 226b, respectively. Alternatively, the cover mounts 230a, 230b may be formed of separate components with that of the loudspeaker enclosures 228a, 228b, respectively.

Figure 15:
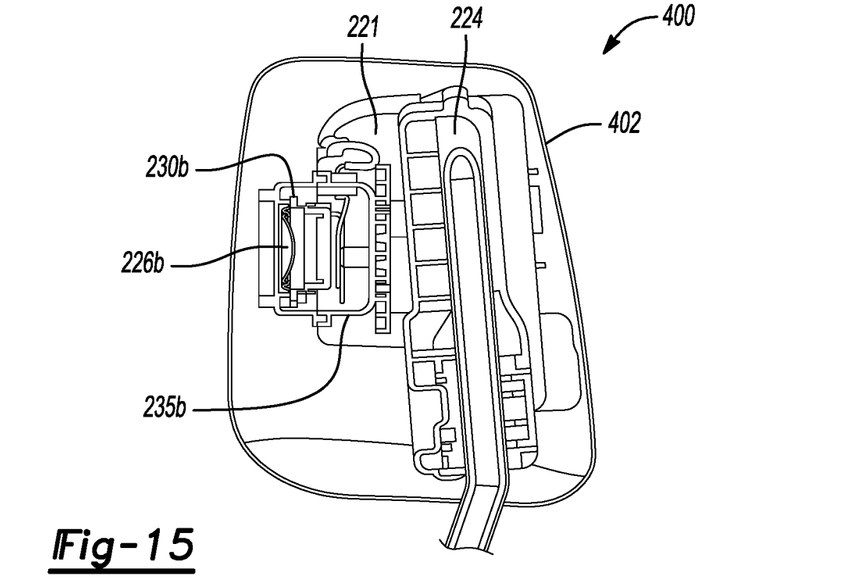
FIG. 15 depicts a side view of the fourth headrest in accordance to one embodiment.
Figure 16:
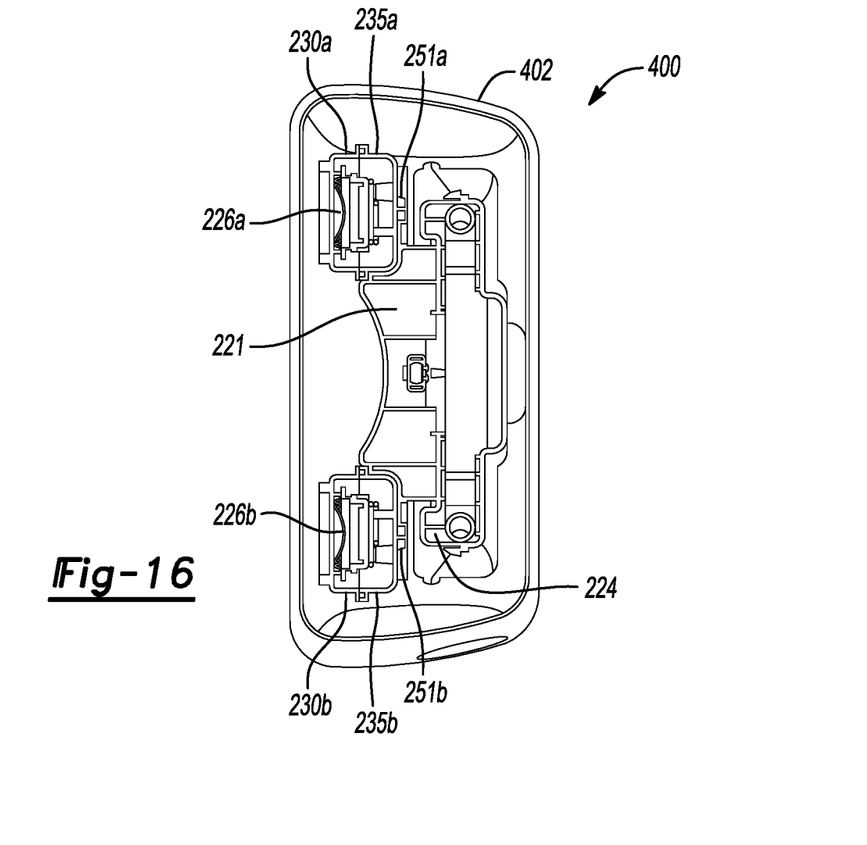
FIG. 16 depicts a top view of the fourth headrest in accordance to one embodiment.

FIG. 15 generally depicts a side view of the fourth headrest 400 in accordance to one embodiment. FIG. 16 generally depicts a top view of the fourth headrest 400 in accordance to one embodiment. In this example, a first gap 269a and a second gap 269b is formed between a front face of the core 224 and the extending flange portions 251a, 251b, respectively. In the event the overall length of the loudspeaker enclosures 228a, 228b need to be increased to facilitate a smaller profile for the outer shell 402 or to simply provide more volume or air pressure to enable the loudspeakers 226a, 226b to provide more audio volume in the interior of the vehicle 114, such an increase may be possible by reducing or simply eliminating the first gaps 269a, 269b.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle apparatus comprising:
a core including an outer periphery and being positioned within a headrest for a seat of a vehicle;
a nose for attachment to the core and being positioned within the headrest;
a first loudspeaker positioned on the nose for providing an audio signal from the headrest; and
a first loudspeaker housing to receive the first loudspeaker and being positioned on the nose,
wherein the first loudspeaker housing extends along a first outer edge of the core to decrease an overall length of the core and the nose along a first axis in the vehicle,
wherein the first axis extends in a fore and aft direction in the vehicle, and wherein the first loudspeaker housing defines a first enclosed volume that extends past the outer periphery of the core to store air for the first loudspeaker during audio playback.

2. The vehicle apparatus of claim 1, wherein the first enclosed volume extends along the first outer edge of the core to increase an amount of air stored therein.

3. The vehicle apparatus of claim 1, wherein the first loudspeaker housing is integrated with the nose to form a single component.

4. The vehicle apparatus of claim 1 further comprising a second loudspeaker positioned opposite to the first loudspeaker on the nose.

5. The vehicle apparatus of claim 4, further comprising a second loudspeaker housing to receive the second loudspeaker and being positioned on the nose.

6. The vehicle apparatus of claim 4, wherein the second loudspeaker housing defines a second enclosed volume that extends past the outer periphery of the core to store air for the second loudspeaker during audio playback.

7. The vehicle apparatus of claim 6, wherein the core includes a first side and a second side that is positioned opposite to the first side, and wherein the first enclosed volume extends past the outer periphery on the first side of the core and the second enclosed volume extends past the outer periphery on the second side of the core.

8. The vehicle apparatus of claim 1, wherein the nose includes a plurality of first connecting mechanisms positioned on a rear side thereof for mating with a plurality of second connecting mechanisms positioned on a front side of the core to couple the nose to the core.

9. The vehicle apparatus of claim 8, wherein the plurality of first connecting mechanisms slideably engage the plurality of second connecting mechanisms to couple the nose to the core.

10. The vehicle apparatus of claim 1, wherein the core, the nose, and the first loudspeaker are capable of being packaged in a number of outer shells of the headrest that extend at different lengths from one another in a fore and aft direction of the vehicle.

11. A vehicle apparatus for being positioned in a headrest of a vehicle, the apparatus comprising:
a core including an outer periphery and being positioned within the headrest for a seat of the vehicle;
a nose for attachment to the core and being positioned within the headrest;
a first loudspeaker positioned on a first side of the nose for providing an audio signal from the headrest; and
a first loudspeaker housing to receive the first loudspeaker and being positioned on the first side of the nose,
a second loudspeaker positioned on a second side of the nose that is opposite to the first side of the nose for providing the audio signal from the headrest; and
a second loudspeaker housing to receive the second loudspeaker and being positioned on the second side of the nose;
wherein the first loudspeaker housing defines a first enclosed volume that extends past the outer periphery of the core to store air for the first loudspeaker during audio playback.

12. The vehicle apparatus of claim 11, wherein the first loudspeaker housing and the second loudspeaker housing are integrated with the nose and are positioned in front of the core.

13. The vehicle apparatus of claim 11, wherein the nose includes a plurality of first connecting mechanisms positioned on a rear side thereof for mating with a plurality of second connecting mechanisms positioned on a front side of the core to couple the nose to the core.

14. The vehicle apparatus of claim 13, wherein the plurality of first connecting mechanisms slideably engage the plurality of second connecting mechanisms to couple the nose to the core.

15. The vehicle apparatus of claim 11, wherein the core, the nose, and the first loudspeaker are capable of being packaged in a number of outer shells of the headrest that extend at different lengths from one another in a fore and aft direction of the vehicle.

16. The vehicle apparatus of claim 11, wherein the second loudspeaker housing defines a second enclosed volume that extends past the outer periphery of the core to store air for the second loudspeaker during audio playback.

17. A vehicle apparatus comprising:
a core including an outer periphery and being positioned within a headrest for a seat of a vehicle;
a nose for attachment to the core;
a first loudspeaker positioned on the nose for providing an audio signal from the headrest; and
a first loudspeaker housing including a first enclosed volume to receive the first loudspeaker and being positioned on the nose,
wherein the first enclosed volume extends past the outer periphery of the core to decrease an overall length of the core and the nose along a first axis in the vehicle, and
wherein the first axis extends along a fore and aft direction in the vehicle.

18. The vehicle apparatus of claim 17, wherein the enclosed volume extends along a first outer edge of the core to increase an amount of air stored therein to enable the loudspeaker to playback the audio.

19. The vehicle apparatus of claim 18 further comprising a second loudspeaker housing positioned on the nose to receive a second loudspeaker, the second loudspeaker housing including a second enclosed volume that extends past the outer periphery of the core to decrease an overall length of the core and the nose along the first axis in the vehicle.

* * * * *